United States Patent
Ellis et al.

(10) Patent No.: US 7,761,990 B2
(45) Date of Patent: Jul. 27, 2010

(54) METHOD OF REPAIRING A STATIONARY AIRFOIL ARRAY DIRECTING THREE-DIMENSIONAL FLOW

(75) Inventors: Wes L. Ellis, Leesburg, OH (US); Mark Greene, Winchester, OH (US)

(73) Assignee: PAS Technologies, Inc., North Kansas City, MO (US)

( * ) Notice: Subject to any disclaimer, the term of this patent is extended or adjusted under 35 U.S.C. 154(b) by 304 days.

(21) Appl. No.: 11/904,444

(22) Filed: Sep. 26, 2007

(65) Prior Publication Data

US 2008/0078079 A1    Apr. 3, 2008

Related U.S. Application Data

(60) Provisional application No. 60/847,417, filed on Sep. 26, 2006.

(51) Int. Cl.
  B23P 6/00    (2006.01)
  B21K 25/00    (2006.01)
  F03D 5/00    (2006.01)

(52) U.S. Cl. ............... 29/889.1; 29/889.21; 29/889.22; 415/209.4

(58) Field of Classification Search ............ 29/889.1, 29/889.7, 889.71, 889.72, 402.06, 402.07, 29/402.09, 402.11, 402.13, 402.16, 402.19, 29/889.21, 889.22; 415/209.4, 189–190, 415/209.2–209.3, 210.1

See application file for complete search history.

(56) References Cited

U.S. PATENT DOCUMENTS

| | | | |
|---|---|---|---|
| 3,909,157 A * | 9/1975 | Wachtell et al. | 415/208.3 |
| 4,141,124 A | 2/1979 | Ryan | |
| 5,226,789 A * | 7/1993 | Donges | 415/189 |
| 5,474,419 A * | 12/1995 | Reluzco et al. | 415/209.4 |
| 5,494,404 A * | 2/1996 | Furseth et al. | 415/209.3 |
| 5,732,468 A | 3/1998 | Galley et al. | |
| 5,765,993 A * | 6/1998 | Weiss | 415/209.2 |
| 5,797,725 A * | 8/1998 | Rhodes | 415/209.2 |
| 6,494,677 B1 * | 12/2002 | Grady | 415/209.4 |
| 6,543,995 B1 * | 4/2003 | Honda et al. | 415/189 |
| 6,616,408 B1 * | 9/2003 | Meier | 416/193 A |
| 6,905,308 B2 * | 6/2005 | Hagle et al. | 415/209.4 |

FOREIGN PATENT DOCUMENTS

| | | |
|---|---|---|
| EP | 1 227 218 | 7/2002 |
| EP | 1 422 381 | 5/2004 |

* cited by examiner

*Primary Examiner*—David P Bryant
*Assistant Examiner*—Jacob J Cigna
(74) *Attorney, Agent, or Firm*—Ropes & Gray LLP

(57) ABSTRACT

A method of replacing an individual damaged compressor stator airfoil includes machining an oversized slot through the stator casing, removing the damaged airfoil, and joining a sleeve to the replacement airfoil and stator casing. The oversized slot creates sufficient clearance for removal of a three-dimensional airfoil, while the sleeve creates a sufficiently tight fit to allow the pieces to be brazed together.

15 Claims, 6 Drawing Sheets

METHOD OF REPAIRING A STATIONARY AIRFOIL ARRAY DIRECTING THREE-DIMENSIONAL FLOW

RELATED APPLICATION

The instant application claims priority from provisional application No. 60/847,417, filed Sep. 26, 2006, the disclosure of which is incorporated by reference herein in its entirety.

FIELD OF THE INVENTION

The invention relates generally to gas turbine engines, and to methods for repairing compressor stator airfoils.

BACKGROUND OF THE INVENTION

The compressor section of an aircraft turbine engine compresses incoming air such that oxygen is concentrated at a level sufficient for combustion. The stator section of a compressor contains an array of airfoils that act to direct airflow downstream into the combustion chamber of the turbine. Aircraft stators are precision fabrications, and are typically manufactured from stainless steels such as type 410/420 (Martensitic), wrought nickel alloys such as Hastelloy alloy type X, Inconel alloy 718, or possibly titanium. Many engines use airfoils commonly referred to as two-dimensional (2D) airfoils. Two dimensional airfoils capture airflow losses in two directions. More recently three-dimensional (3D) airfoils have come into frequent usage. Three-dimensional airfoils have an advantage over two-dimensional airfoils in that they capture flow losses in a third additional direction, i.e., in the radially outward direction. Thus, turbines that employ 3D stator airfoils are more efficient than their 2D counterparts.

SUMMARY OF THE INVENTION

The cross section of a 3D airfoil varies along three principal axes. In contrast, the cross section of a 2D airfoil varies along only two principal axes. While the complex geometry of 3D airfoils allows for increased efficiency, it renders many methods used to repair damaged 2D airfoils inapplicable to the repair of 3D airfoils. 2D airfoil repair schemes enable easy replacement of individual damaged 2D airfoils. For example, one repair scheme involves mechanically punching the inner ring of a stator case such as to shear the brazed slots that hold the damaged 2D airfoil to the inner and outer rings, and reinserting a replacement 2D airfoil through the slot for re-brazing. This repair scheme, however, can not be used to repair individual 3D airfoils because the cross section of 3D airfoils varies along the axis on which it is being removed or replaced. This causes a mechanical interference between the airfoil and the stator casing. Large sections of the stator, or the entire stator itself, must therefore be replaced at a high cost to the engine operator. Accordingly, there is a need for a method for selectively removing and replacing 3D airfoils from a compressor stator.

In one embodiment of the invention, a damaged airfoil is replaced by using electrical discharge machining to open an oversized slot in the outer ring of the stator that is sufficiently large to allow clearance for removal of a single damaged airfoil and insertion of a replacement airfoil. The damaged and replacement airfoils are moved out of and into position through the oversized slot. The gap between the outer ring and replacement airfoil, resulting from the formation of the oversized slot, is filled with a sleeve that is designed to match the contours of the replacement airfoil and oversized slot. The sleeve, replacement airfoil, and stator are then permanently joined by vacuum brazing. The sleeve is of the same or similar material as the stator, of the same thickness as the stator casing, and is manufactured by way of electrical discharge machining.

In alternative embodiments, the oversized slot is created by means of milling, abrasive water jet, laser, mechanical punching or stamping, selective debrazing, acid-leaching or other technique known in the art for making precision cuts in metal. In further alternative embodiments, the sleeve is manufactured by milling, abrasive water jet, laser, mechanical punching or stamping, forging, or similar technique. Alternatively, the sleeve shape may be integrated onto the replacement airfoil at the time the replacement airfoil is manufactured. In further alternative embodiments, the damaged airfoils are removed by removal methods such as mechanical grinding.

BRIEF DESCRIPTION OF THE FIGURES

The foregoing discussion will be understood more readily from the following detailed description of the invention with reference to the following drawings.

FIG. 1A is a 2D airfoil. FIG. 1B is a 3D airfoil.

ILLUSTRATIVE DESCRIPTION

To provide an overall understanding of the invention, certain illustrative embodiments will now be described, however, it will be understood by one of ordinary skill in the art that the methods described herein may be adapted and modified as is appropriate for the application being addressed and that the methods described herein may be employed in other suitable applications, and that such other additions and modifications will not depart from the scope hereof.

Figure 1:
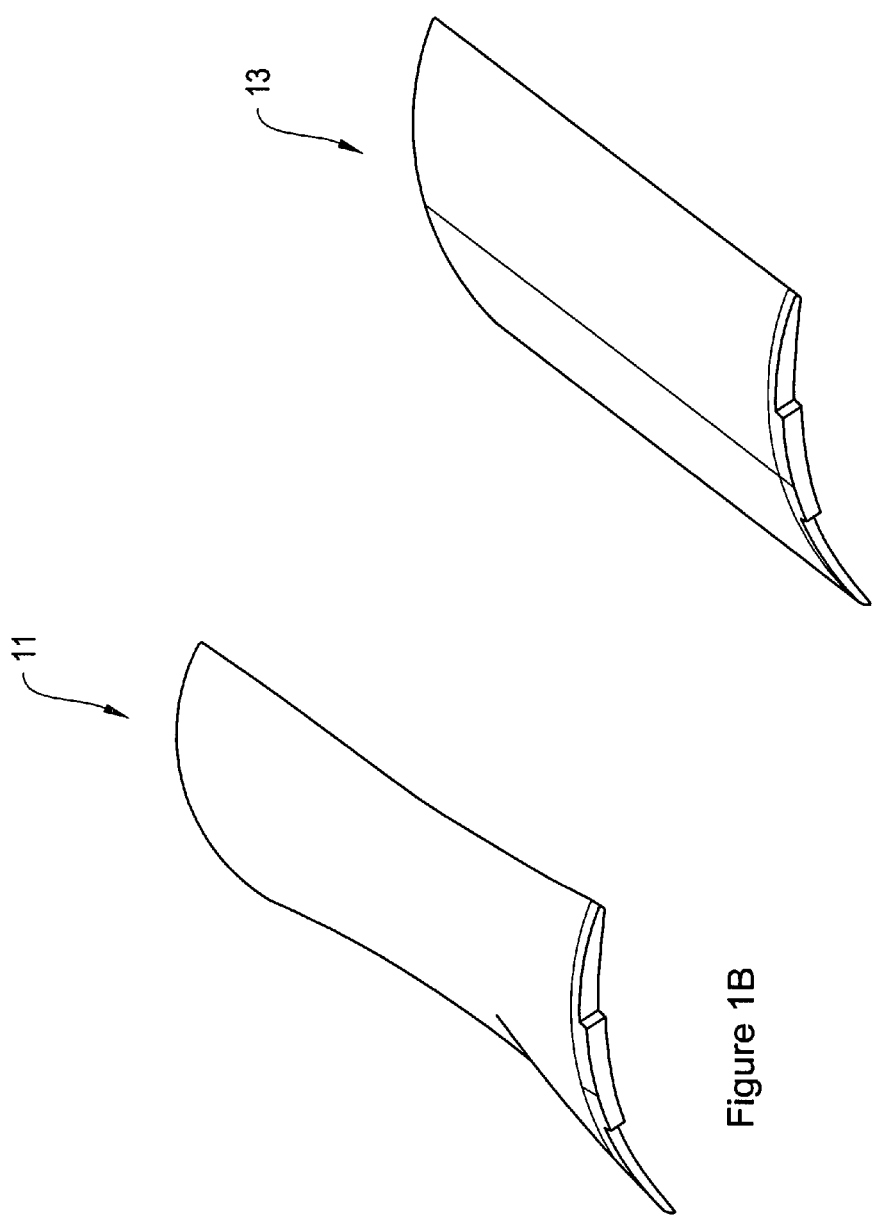
FIGS. 1A and 1B are perspective views of stator airfoils according to an illustrative embodiment of the invention.

FIGS. 1A and 1B are perspective views of stator airfoils according to an illustrative embodiment of the invention. FIG. 1A is a 2D airfoil. FIG. 1B is a 3D airfoil. As can be seen, the cross sectional profile of the 2D airfoil 13 varies in the x and y directions, and is constant in the z direction. The cross sectional profile of the 3D airfoil 11 varies in each of the x, y, and z directions. This gives the 3D airfoil a "twist" not found in the 2D airfoil.

Figure 2:
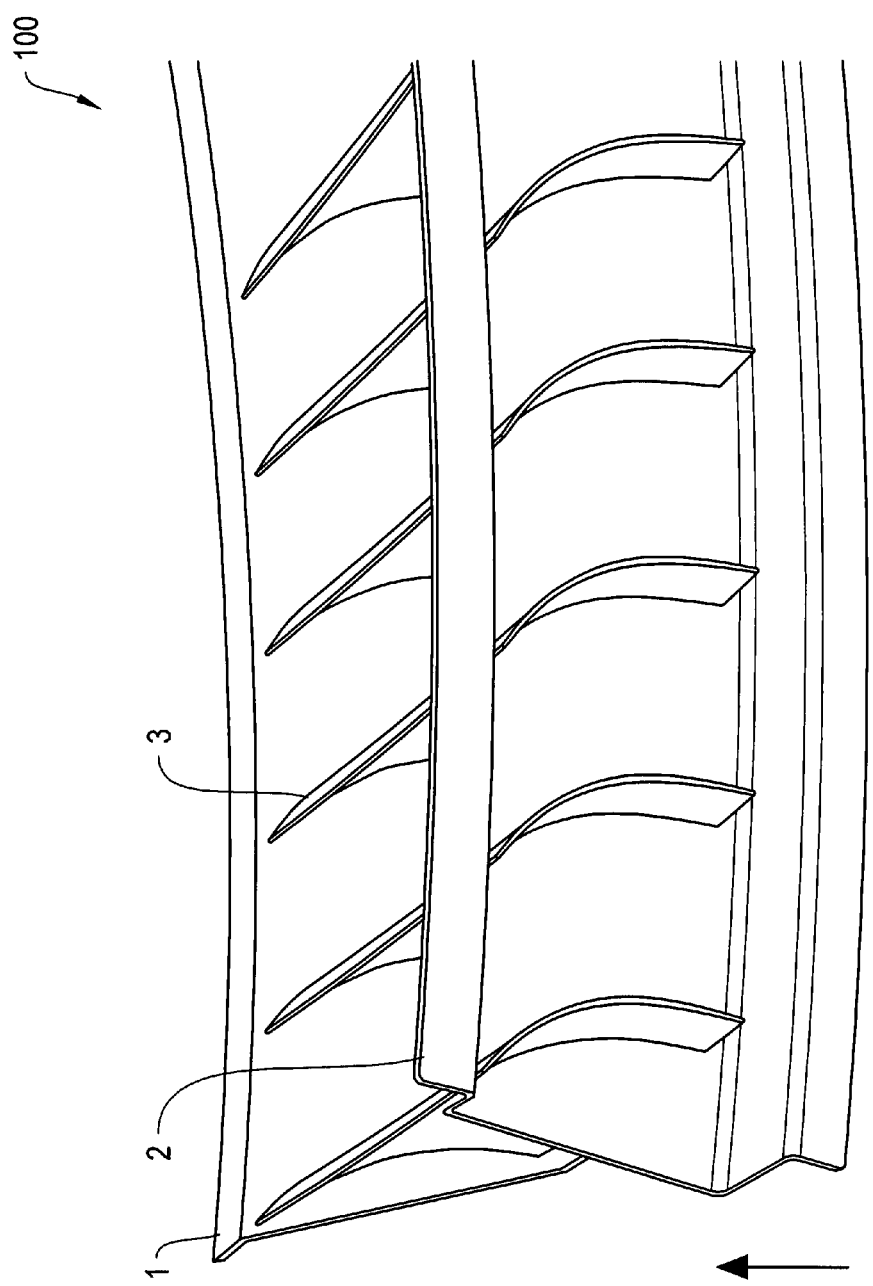
FIG. 2 is a perspective view of a section of a stator case with airfoils attached according to an illustrative embodiment of the invention.

FIG. 2 is a perspective view of a section of a stator case 100 with airfoils attached according to the illustrative embodiment. It includes an inner ring 1 and outer ring 2. A series of three-dimensional airfoils 3 are rigidly attached to the inner ring 1 and outer ring 2, forming a single, solid structure. The three dimensional airfoils 3 of FIG. 2 have the same general shape as the airfoil 11 of FIG. 1B, in that their geometry varies in three dimensions.

Figure 3:
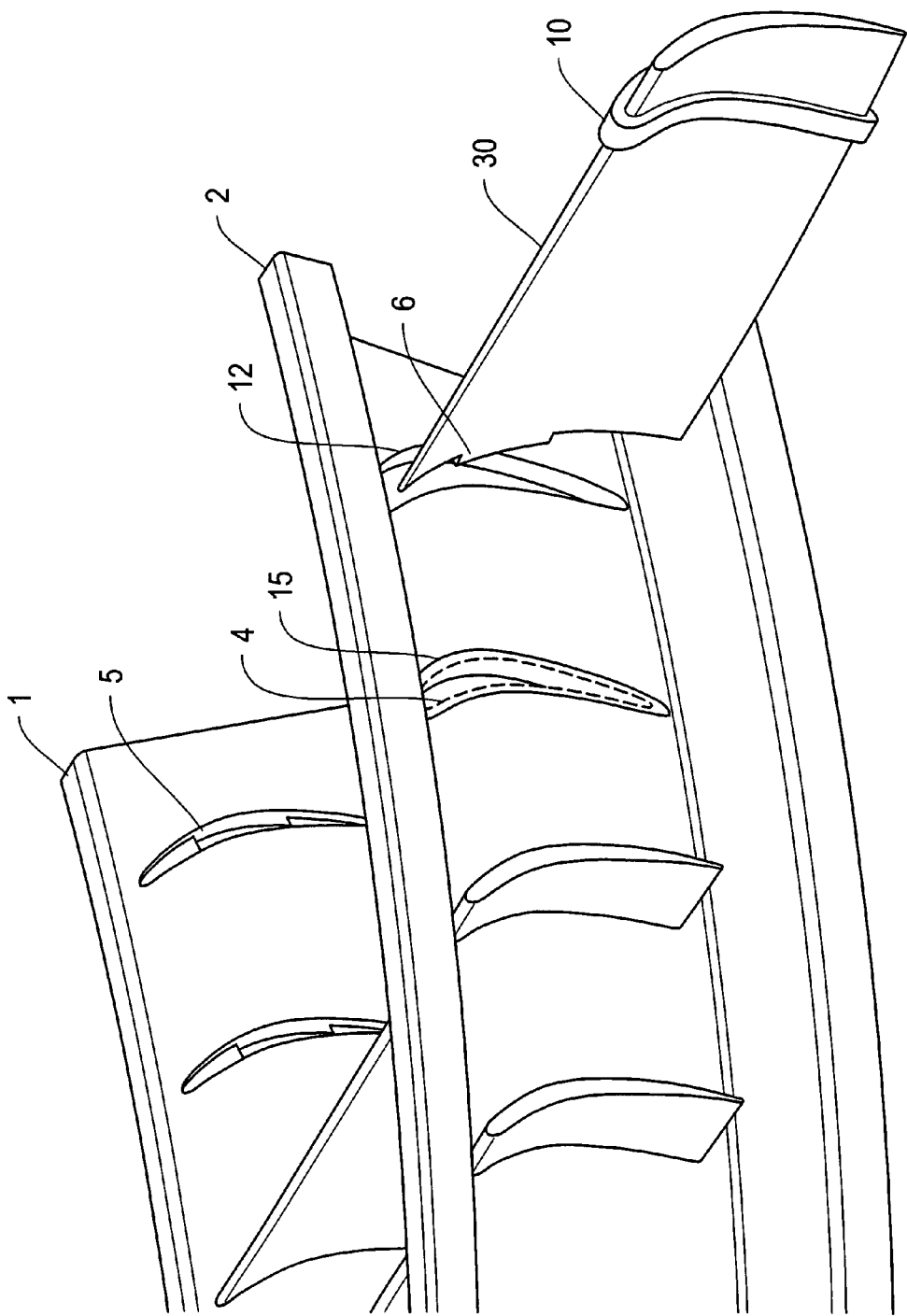
FIG. 3 is a perspective view of a section of a stator case with a damaged airfoil partially removed from the stator case according to an illustrative embodiment of the invention.

FIG. 3 is a perspective view of a section of the stator case 100 with a damaged airfoil 30 partially removed from the stator case 100 through an oversized slot 12 according to the illustrative embodiment. A slot 15 in the outer ring illustrates where another damaged airfoil has already been removed. To illustrate the oversized nature of the slot 15 used to remove the damaged airfoil and slot 12 used to remove damaged airfoil 30, the shape 4 of a cross section of the removed airfoil where the removed airfoil interfaced with the outer ring 2 prior to removal is shown superimposed on the slot 15.

The damaged airfoil 30 can not be removed through a slot having the shape 4 because the cross section of the airfoil 30 varies along the axis along which it is to be removed, i.e., the axis perpendicular to the outer ring 2 (the "z" direction). The geometrical variation of airfoil 30 in the z direction acts to cause a mechanical interference between the airfoil 30 and the outer ring 2 as one would attempt to remove the airfoil 30 through a slot with shape 4. Accordingly, an oversized slot 12 is formed in the outer ring 2 to facilitate removal of damaged airfoil 30. The oversized slot 12 is made large enough to allow for the variation in geometry of airfoil 30 along the z axis. The profile of the slot 12 of the illustrative embodiment is of the same general shape of a cross section of the airfoil 30 being removed, and is oversized to accommodate the removal of airfoil 30 without being so large as to cause damage to nearby airfoils or overly weaken the outer ring 2. In this embodiment, the oversized slot 12 is about ⅛" wider than shape 4, although an oversized slot may range anywhere from 0.020 inches to 0.200 inches wider than shape 4, depending on the specific model of stator and particular airfoils being replaced. The slot 12 is created by means of electrical discharge machining (EDM), although such techniques as milling, abrasive water jet, laser, mechanical punching or stamping, selective de-brazing, or acid leaching may also be employed.

EDM is also used to detach the airfoil 30 from the inner ring 1. When attached, the airfoil 30 has a flange 6 that is joined to the inner ring 1 of the stator case along a profile 5. To remove the airfoil 30 from the inner ring 1, it is not necessary to create an oversized slot in the inner ring 1. The inner ring 1 need only be machined along the profile 5, corresponding to the flange 6 that interfaces with inner ring 1. The section 10 of the outer ring 2 that has been machined out, thus creating oversized slot 12, remains attached to the airfoil 30 and can be used as a handle in aiding the removal of airfoil 30 through oversized slot 12.

Figure 4:
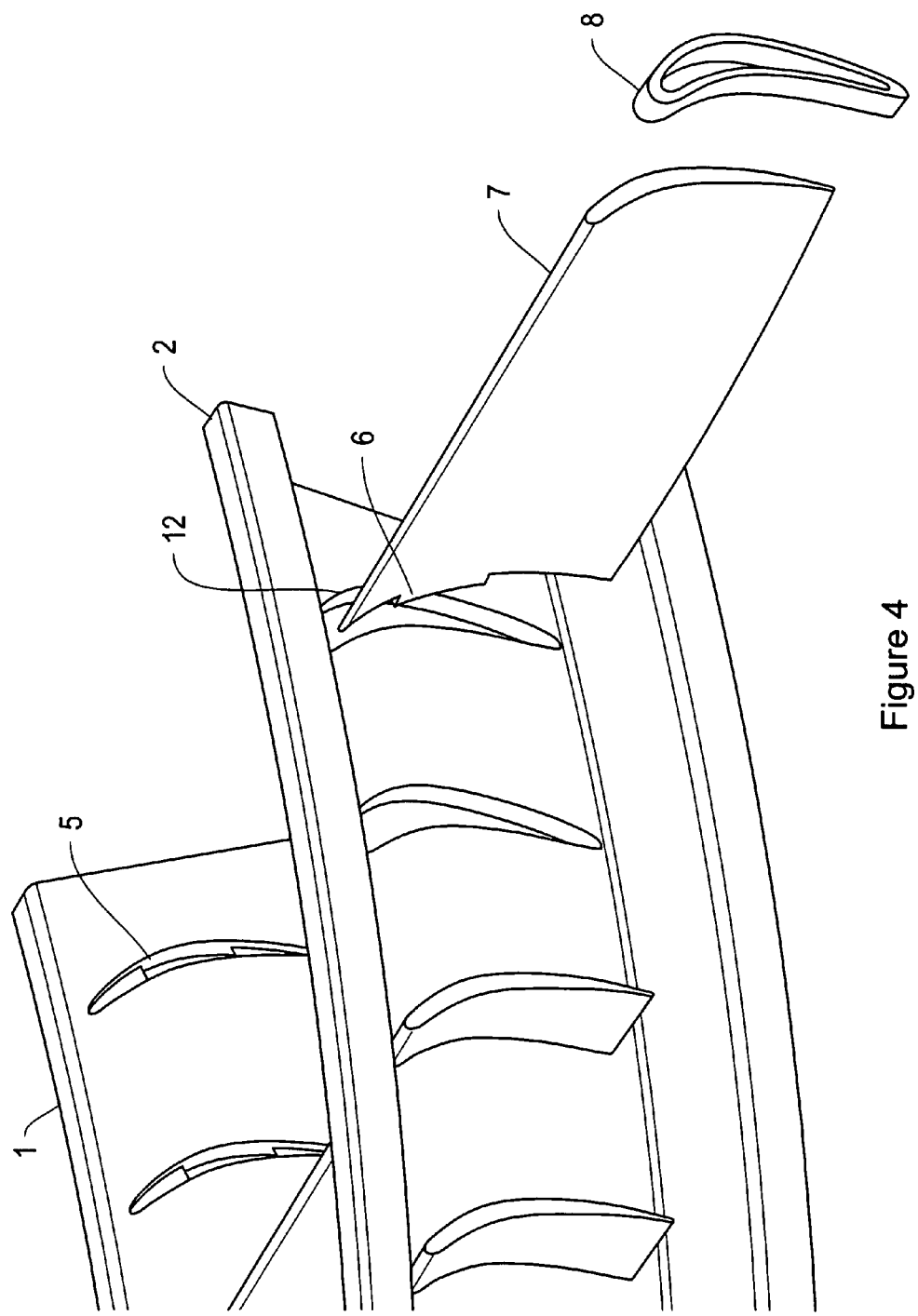
FIG. 4 is a perspective view of a section of a stator case with a sleeve and a replacement airfoil, prior to replacement, according to an illustrative embodiment of the invention.

FIG. 4 is a perspective view of a section of the stator case 100 with a sleeve 8 and replacement airfoil 7, prior to replacement, according to an illustrative embodiment of the invention. Airfoil 30 is completely removed. Prior to attaching a replacement airfoil 7, the sleeve 8 is manufactured to provide structural support between the outer ring 2 and the replacement airfoil. The outer surface of the sleeve 8 has the same contour as the oversized slot 12, while the inner surface of the sleeve 8 has the same contour as the replacement airfoil 7. As such, the sleeve 8 provides a close fit between replacement airfoil 7 and the outer ring 2 to allow the formation of a brazed structure with sufficient strength to withstand the forces on the replacement airfoil 7 at high velocity. In this embodiment, the sleeve 8 is designed of identical material as the outer ring 2, and is the same thickness as the outer ring 2. This ensure compatibility with the outer ring 2. The sleeve 8 in this embodiment is manufactured by electrical discharge machining, although such techniques such as milling, abrasive water jet, laser, mechanical punching or stamping, or forging may also be employed. Alternatively, the sleeve shape 8 can be integrated onto the end of replacement airfoil 7 at the time replacement airfoil 7 is manufactured. In this illustrative embodiment, the replacement airfoil 7 is inserted through oversized slot 12 prior to insertion of the sleeve 8 into the space between the replacement airfoil 7 and the outer ring 2. As an alternative, the sleeve 8 is brazed to the replacement airfoil 7 prior to insertion of the replacement airfoil 7 through the oversized slot 12, after which the sleeve 8 is joined to the outer ring 2. The replacement airfoil 7 is joined to the inner ring 1 by various methods known in the art such as welding or brazing. In this illustrative embodiment, vacuum brazing is utilized because of its ability to produce strong joints free of flux, which can lead to corrosion.

Figure 5:
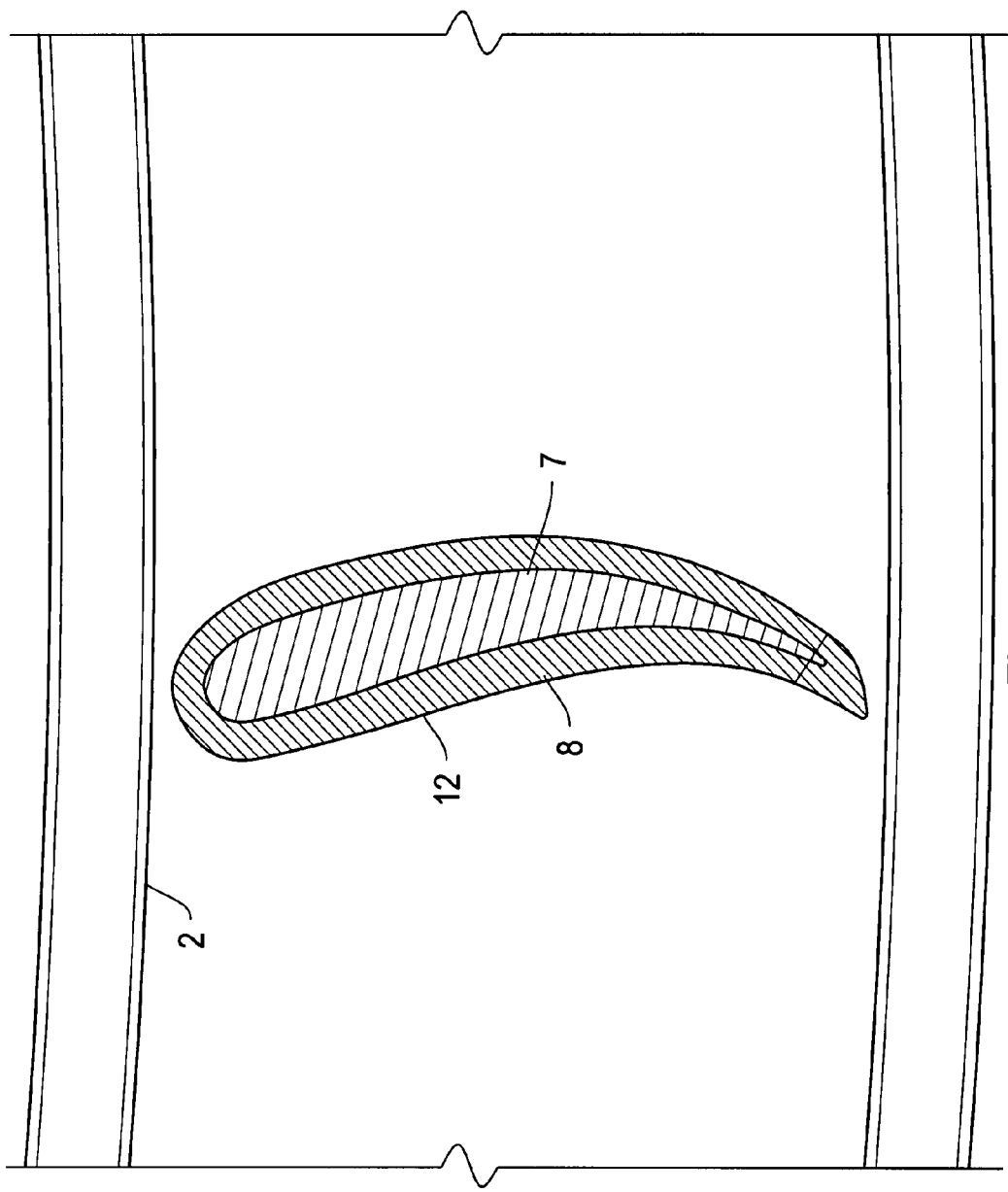
FIG. 5 is a top view of the outer ring of a stator case, a sleeve, and a replacement airfoil brazed together, according to an illustrative embodiment

FIG. 5 is a top view of the outer ring 2 of stator case 100, the sleeve 8, and the replacement airfoil 7 brazed together, according to an illustrative embodiment.

Figure 6:
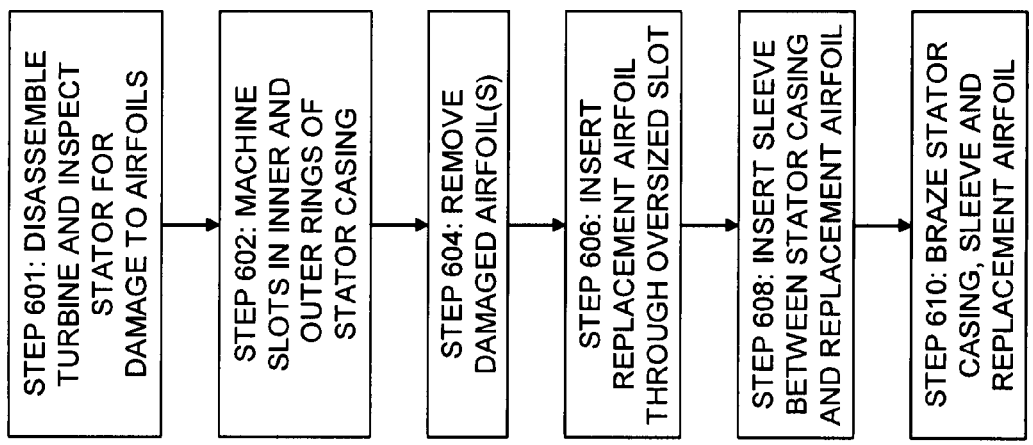
FIG. 6 is a flowchart of a method for repairing a 3D stator airfoil, according to an illustrative embodiment of the invention.

FIG. 6 is a flowchart of a method for repairing a 3D stator airfoil, according to the illustrative embodiment. The method 600 begins at step 601 with disassembly of the turbine and inspection of the stator for damage. Individual airfoils that are damaged beyond acceptable operating limits are marked for selective removal and replacement.

At step 602, wire EDM is used to machine out pre-designed slots in the inner and outer rings of the stator case. The slots are pre-designed in a computer-aided-drafting (CAD) replica of the specific model of stator being repaired. The slot in the outer ring is pre-designed to be oversized and oriented as to allow clearance for removal of the damaged airfoil without causing damage to surrounding airfoils or overly weakening the outer ring. The slot in the inner ring is pre-designed to disconnect the bonding point between the damaged airfoil and inner ring. The design of the each slot may be unique depending on the specific airfoil being replaced and the size and shape of the particular model of stator under repair. EDM is the preferred method of machining out the pre-designed slots because of its ability to machine complex shapes with a high degree of accuracy. As understood in the art, a small hole is first drilled through the stator case, and the EDM wire is inserted through it. A computer-numerically-controlled (CNC) machine controls the cutting pattern of the wire based on code generated from the CAD model.

At step 604, the damaged airfoils are removed either mechanically or by hand through the oversized slots machined in step 604. At step 606, replacement airfoils are inserted either mechanically or by hand through the oversized slots, such that the flanges of the replacement airfoils lock into the slots machined into the inner ring at step 604.

At step 608, a pre-manufactured sleeve is inserted either mechanically or by hand into the space between the replacement airfoil and outer ring. The sleeve is pre-manufactured such that its outer edge matches the shape of the oversized slot and its inner edge matches the shape of the base of the replacement airfoil. The sleeve design also allows for an appropriate amount of clearance for the application of a brazing alloy in the final step, and for proper alignment of the replacement airfoil in the casing. Insertion of the pre-manufactured sleeve into the space between the replacement airfoil and outer ring creates a tight fit between the replacement airfoil, sleeve, and outer ring.

Finally, at step 610, all pieces are joined by way of placing them in a suitable chamber for vacuum brazing, as understood in the art, to create a permanent bond between the inner and outer rings, sleeve, and replacement airfoil. Ni—Cr—Si—B braze alloys are generally compatible with stator casings manufactured from wrought nickel alloys. Ni—P braze alloys are generally compatible with stator casings manufactured from stainless steels. Likewise, Ti—Cu—Ni braze alloys are generally compatible with stator casings manufactured from titanium alloys.

It will be understood by those of skill in art that the order of the steps outlined above may be altered, that certain steps may be omitted or combined, and that certain alternative methods may also be utilized. For example, the damaged airfoils may be cut and then mechanically ground down to the surfaces of the inner and outer rings, as understood in the art, in lieu of removing them through the oversized slot (which is still utilized to allow clearance for insertion of the replacement airfoil). As another example, in lieu of manufacturing the replacement airfoil and sleeve as separate pieces, the sleeve shape may be integrated onto the replacement airfoil itself at the time it is manufactured. As a final example, RAM EDM can be utilized to machine the oversized slot in the stator case in lieu of wire EDM. As understood in the art, this entails the machining of an electrode the shape of which is the same as the oversized slot being machined. The invention may be embodied in other specific forms without departing from the spirit or essential characteristics thereof. The foregoing embodiments are therefore to be considered in all respect illustrative, rather than limiting of the invention.

What is claimed:

1. A method of replacing a stator airfoil attached to an outer ring and an inner ring of an original casing, said method comprising:
    creating an oversized slot through the outer ring of the original casing;
    removing the stator airfoil through the oversized slot, wherein the outer ring and the inner ring remain attached by at least one airfoil;
    joining a sleeve coupled to a replacement airfoil to the original casing.

2. The method of claim 1, comprising incorporating the sleeve onto an end of the replacement airfoil.

3. The method of claim 1, comprising inserting the replacement airfoil through the oversized slot.

4. The method of claim 1, comprising manufacturing the sleeve.

5. The method of claim 1, comprising brazing the sleeve to the replacement airfoil.

6. The method of claim 1, comprising welding the sleeve to the replacement airfoil.

7. The method of claim 1, wherein joining the sleeve to the original casing comprises brazing the sleeve to the casing.

8. The method of claim 1, wherein joining the sleeve to the original casing comprises welding the sleeve to the casing.

9. The method of claim 1, wherein the airfoil comprises a flange at one end to mate with the inner ring of the original casing, the method comprising machining a slot in the inner ring of the casing having a shape and size that matches the flange to free the airfoil from the inner ring.

10. The method of claim 9, wherein the replacement airfoil comprises a flange at one end to mate with the inner ring of the original casing, the method comprising joining the flange of the replacement airfoil to the inner ring of the casing at the slot machined in the inner ring.

11. The method of claim 1, wherein the stator airfoil comprises a 3D stator airfoil.

12. The method of claim 1, wherein the oversized slot is shaped to be between 0.020 inches to 0.200 inches wider than a cross section of the stator airfoil where it meets the outer ring of the original casing.

13. The method of claim 1, wherein the oversized slot shares substantially the same shape as a cross-section of the airfoil where the airfoil meets the outer ring of the original casing.

14. The method of claim 1, wherein creating an oversized slot comprises forming a slot using electrical discharge machining.

15. The method of claim 1, wherein creating an oversized slot comprises forming a slot using one of milling, abrasive water jet, laser, mechanical punching or stamping, selective de-brazing, and acid leaching.

* * * * *